(12) United States Patent
Kurotsu

(10) Patent No.: US 8,891,141 B2
(45) Date of Patent: Nov. 18, 2014

(54) IMAGE READING APPARATUS AND IMAGE FORMING APPARATUS HAVING THE SAME

(71) Applicant: KYOCERA Document Solutions Inc., Osaka (JP)

(72) Inventor: Yoshihiko Kurotsu, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/023,277

(22) Filed: Sep. 10, 2013

(65) Prior Publication Data

US 2014/0071500 A1 Mar. 13, 2014

(30) Foreign Application Priority Data

Sep. 11, 2012 (JP) ................................. 2012-199325

(51) Int. Cl.
*H04N 1/04* (2006.01)
*H04N 1/00* (2006.01)

(52) U.S. Cl.
CPC ............ *H04N 1/00519* (2013.01); *H04N 1/00* (2013.01)
USPC ........... 358/474; 358/497; 358/486; 382/191; 399/301

(58) Field of Classification Search
CPC . H04N 1/4097; H04N 1/401; H04N 1/00002; H04N 1/00045; H04N 1/00063; H04N 1/00082; H04N 1/00013; H04N 1/00037; H04N 1/0005; H04N 1/1017; H04N 1/193; H04N 1/6033; H04N 1/40056; H04N 1/00018
USPC .......... 358/474, 1.9, 406, 461, 509, 2.1, 3.26, 358/3.27, 447, 448, 463, 475, 486, 488, 358/497, 498, 505, 518; 382/115, 124, 191, 382/275, 125, 168; 399/15, 301, 74
See application file for complete search history.

(56) References Cited

U.S. PATENT DOCUMENTS

| | | | | |
|---|---|---|---|---|
| 7,202,980 B2 * | 4/2007 | Hayashi | ......................... | 358/475 |
| 7,224,495 B2 * | 5/2007 | Yui et al. | ....................... | 358/474 |
| 8,422,093 B2 * | 4/2013 | Ishida | ........................... | 358/475 |
| 8,422,917 B2 * | 4/2013 | Shinkawa | ..................... | 399/200 |
| 8,643,917 B2 * | 2/2014 | Ishida | ........................... | 358/475 |
| 2013/0243487 A1 * | 9/2013 | Shinkawa | ..................... | 399/221 |

FOREIGN PATENT DOCUMENTS

JP     2009025679 A     2/2009

* cited by examiner

*Primary Examiner* — Negussie Worku
(74) *Attorney, Agent, or Firm* — Alleman Hall McCoy Russell & Tuttle LLP

(57) ABSTRACT

An image reading apparatus according to one aspect of the present disclosure includes a document sheet table, a first carriage, a photoelectric converting portion, and a position detecting portion. First carriage has lighting portion. Position detecting portion detects initial position in reciprocating of first carriage. Lighting portion includes: light guide member on which the light from light source is incident, and which guides incident light in primary scanning direction and applies the light to document sheet table; and heat dissipating member that dissipates heat generated in light source. Position detecting portion includes: light emitter that emits light; light receiver that receives light emitted from light emitter; and detection member that moves in secondary scanning direction along with reciprocating of first carriage, in order to detect initial position of first carriage. Detection member is formed as flat plate that is integrated with heat dissipating member and extends in secondary scanning direction.

17 Claims, 5 Drawing Sheets

IMAGE READING APPARATUS AND IMAGE FORMING APPARATUS HAVING THE SAME

INCORPORATION BY REFERENCE

This application is based upon and claims the benefit of priority from the corresponding Japanese Patent Application No. 2012-199325 filed on Sep. 11, 2012, the entire contents of which are incorporated herein by reference.

BACKGROUND

The present disclosure relates to image reading apparatuses for use in copying machines, facsimile machines, multifunctional peripherals incorporating the entirety or some of functions of these machines, image scanners, or the like, and image forming apparatuses including the image reading apparatuses.

An image forming apparatus forms an electrostatic latent image on a surface of a photosensitive member by causing an image reading apparatus to read an image, on a document sheet, to be copied, and applying laser light to the photosensitive member that is an image carrier, based on document sheet image data having been read. The image reading apparatus applies light from a linearly-arranged light source to the document sheet placed on a document sheet table, and receives light reflected by the document sheet, via a mirror or the like, by a photoelectric converting portion. The photoelectric converting portion converts the received light to an electrical signal. Thus, the document sheet image data is obtained. As a light source that lights a document sheet, a xenon lamp, a light-emitting diode, or the like is used. In recent years, reduction in size and power-saving are required for lighting devices, and image reading apparatuses that use light-emitting diodes as light sources are known.

As lighting devices using light-emitting diodes, lighting devices that use a mode in which multiple light-emitting diodes are disposed along a longitudinal direction (the primary scanning direction) of the lighting device, and lighting devices that use a mode in which light of one light-emitting diode disposed at an end portion in the longitudinal direction is diffused by a light guide member over the entirety of a region in the longitudinal direction, are used. In the mode in which one light-emitting diode is disposed at an end portion in the longitudinal direction, cost is low, and mounting operation is relatively easily performed. However, in this mode, an amount of light with which a document sheet is lit tends to become insufficient, and an amount of light from the lighting device needs to be increased. In order to increase an amount of light from the lighting device, a light-emitting diode that has an enhanced brightness is necessary. Therefore, an electric current to be applied to the light-emitting diode needs to be increased. In this case, increase of an electric current to be applied causes increase in heat value from the light-emitting diode. If heat value from the light-emitting diode increases, in a case where document sheet images are read continuously over a long time period, the temperature of the light-emitting diode rises, and the light-emitting diode is thus likely to be damaged or an amount of emitted light is likely to be reduced. Further, heat is transmitted to optical components, such as a mirror or a lens, near the light-emitting diode, an image sensor of a photoelectric converting portion, or the like. Therefore, a performance for an image formation on the photoelectric converting portion is likely to be degraded.

An associated technique for dissipating heat from a light-emitting diode and reducing rising of temperature in the light-emitting diode, is known. For example, in a publicly known image reading apparatus, a light-emitting diode is mounted onto a substrate, and the substrate having the light-emitting diode mounted thereon is joined to a heat dissipating member made of aluminium, through a heat transmission member. A plurality of heat-dissipating fins are disposed on an outer surface of the heat dissipating member, thereby dissipating heat generated in the light-emitting diode.

In general, in order to enhance a heat dissipating efficiency of the heat dissipating member, a plurality of heat dissipating fins are disposed in the heat dissipating member, or the size of the heat dissipating member itself is increased. Therefore, the size of the lighting device having the heat dissipating member provided therein is increased. Further, in the image reading apparatus, in order to perform reading by scanning a document sheet, a carriage having the lighting device is moved in a secondary scanning direction, and when the reading the document sheet is completed, the carriage is returned to an initial position. In order to stop the carriage at the initial position, the initial position of the carriage is detected by a position detecting portion having a photointerrupter or the like, and a driving motor for the carriage is stopped based on the detection result. In order to detect the initial position of the carriage by means of the position detecting portion, a detection member that moves in the secondary scanning direction according to the carriage reciprocating, is necessary. When the detection member is provided on the outer circumferential portion of the carriage as well as the heat dissipating member is provided in the lighting device as described above, the size of the image reading apparatus is further increased.

SUMMARY

An image reading apparatus according to one aspect of the present disclosure includes a document sheet table, a first carriage, a photoelectric converting portion, and a position detecting portion. The document sheet table has a top surface on which a document sheet is placed. The first carriage has a lighting portion which applies light from a light source so as to diffuse the light toward the document sheet table in a primary scanning direction, and the first carriage can reciprocate in a secondary scanning direction orthogonal to the primary scanning direction. The photoelectric converting portion receives, as image light, light obtained by the light applied by the lighting portion being reflected by an image surface of the document sheet, and converts the received image light to an electrical signal. The position detecting portion detects an initial position in reciprocating of the first carriage. The light source is disposed at an end portion, in the primary scanning direction, of the lighting portion. The lighting portion includes: a light guide member on which the light from the light source is incident, and which guides the incident light in the primary scanning direction and applies the light to the document sheet table; and a heat dissipating member that dissipates heat generated in the light source. The position detecting portion includes: a light emitter that emits light; a light receiver that receives the light emitted from the light emitter; and a detection member that moves in the secondary scanning direction along with the reciprocating of the first carriage, in order to detect the initial position of the first carriage. The detection member is formed as a flat plate that is integrated with the heat dissipating member and extends in the secondary scanning direction.

An image forming apparatus according to another aspect of the present disclosure includes an image reading apparatus, and an image forming portion that forms an image on a recording medium. The image reading apparatus includes a document sheet table, a first carriage, a photoelectric converting portion, and a position detecting portion. The document sheet table has a top surface on which a document sheet is placed. The first carriage has a lighting portion which applies light from a light source so as to diffuse the light toward the document sheet table in a primary scanning direction, and the first carriage can reciprocate in a secondary scanning direction orthogonal to the primary scanning direction. The photoelectric converting portion receives, as image light, light obtained by the light applied by the lighting portion being reflected by an image surface of the document sheet, and converts the received image light to an electrical signal. The position detecting portion detects an initial position in reciprocating of the first carriage. The light source is disposed at an end portion, in the primary scanning direction, of the lighting portion. The lighting portion includes: a light guide member on which the light from the light source is incident, and which guides the incident light in the primary scanning direction and applies the light to the document sheet table; and a heat dissipating member that dissipates heat generated in the light source. The position detecting portion includes: a light emitter that emits light; a light receiver that receives the light emitted from the light emitter; and a detection member that moves in the secondary scanning direction along with the reciprocating of the first carriage, in order to detect the initial position of the first carriage. The detection member is formed as a flat plate that is integrated with the heat dissipating member and extends in the secondary scanning direction.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings. The present disclosure is not limited to the embodiments described below. Further, usages of the present disclosure, terms used herein, and the like are not limited to those described herein.

First Embodiment

Figure 1:
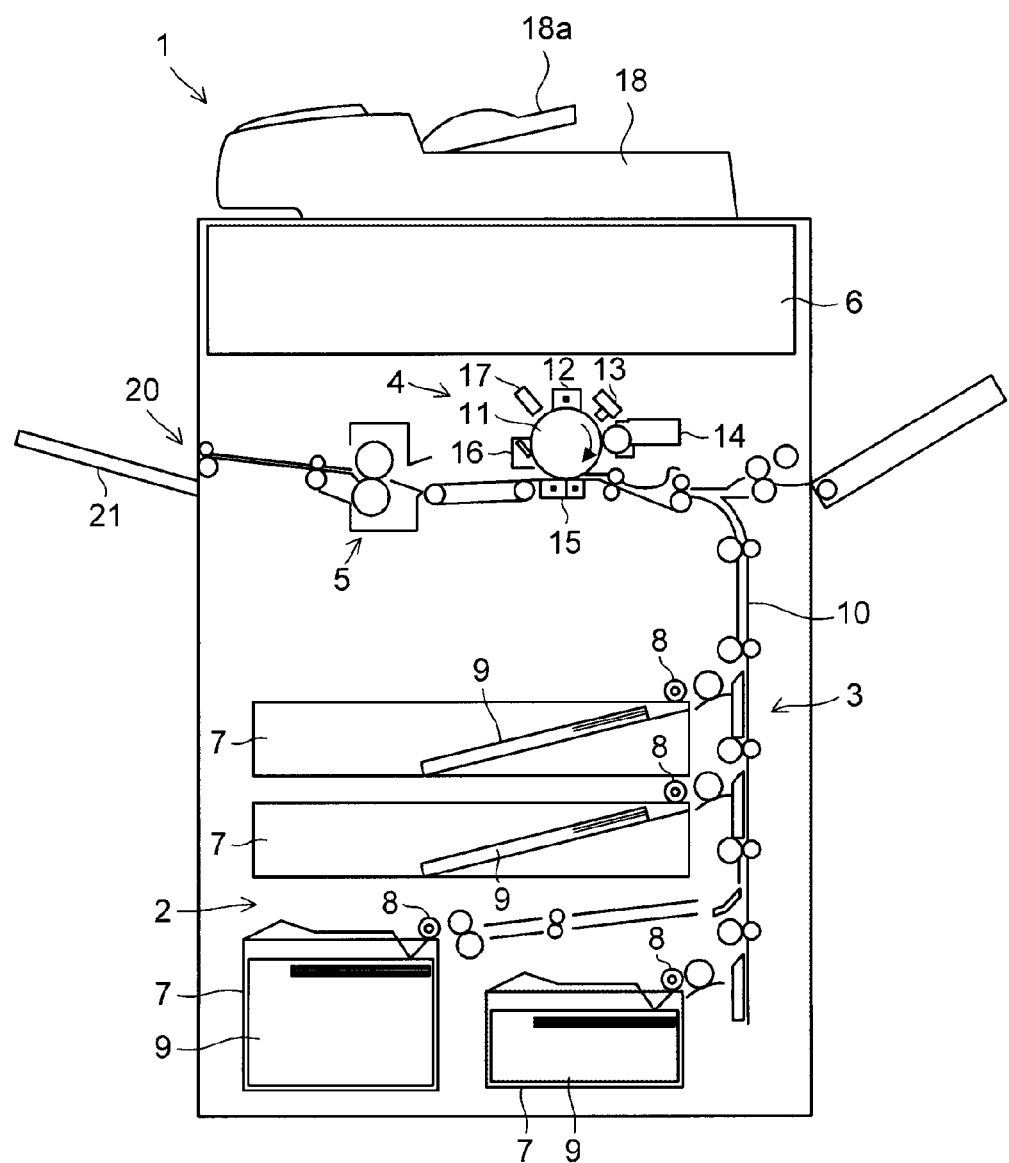
FIG. 1 is a cross-sectional view of an image forming apparatus having an image reading apparatus according to a first embodiment of the present disclosure.

FIG. 1 is a cross-sectional view illustrating a configuration of an image forming apparatus having an image reading apparatus according to an embodiment of the present disclosure. An image forming apparatus 1 includes: a sheet feed portion 2 disposed in the lower portion of the apparatus 1; a sheet conveying portion 3 disposed lateral to the sheet feed portion 2; an image forming portion 4 disposed above the sheet conveying portion 3; a fixing device 5 disposed closer to the discharge side in a sheet conveying direction than the image forming portion 4 is; an image reading apparatus 6 disposed above the image forming portion 4 and the fixing device 5; and a document sheet conveying device 18.

The document sheet conveying device 18 includes a document sheet feed tray 18a in which document sheets on which characters and images, such as figures, to be copied are drawn, are stacked. The document sheet conveying device 18 separates the document sheets one by one from the document sheet feed tray 18a, to convey the separated document sheet to a document sheet table 35 of the image reading apparatus 6. Below the document sheet conveying device 18, the document sheet reading device 6 is disposed. In the document sheet reading device 6, a document sheet conveyed onto the document sheet table 35 from the document sheet conveying device 18, or a document sheet placed on the document sheet table 35 is scanned by using light, to read an image of the document sheet.

The sheet feed portion 2 includes a plurality of sheet feed cassettes 7 in which sheets 9 that are recording mediums are stored. The sheet feed portion 2 feeds the sheets 9 one by one from a selected one of the plurality of sheet feed cassettes 7 to the sheet conveying portion 3 according to rotation of a sheet feed roller 8.

The sheet 9 having been fed to the sheet conveying portion 3 is conveyed via a sheet conveying path 10 of the sheet conveying portion 3 toward the image forming portion 4. The image forming portion 4 forms a toner image on the sheet 9 by electrophotographic process. The image forming portion 4 includes a photosensitive member 11 supported so as to be rotatable in the direction indicated by an arrow in FIG. 1, a charging portion 12, an exposure portion 13, a developing portion 14, a transfer portion 15, a cleaning portion 16, and a static eliminating portion 17 that are disposed around the photosensitive member 11 along the rotation direction thereof.

The charging portion 12 includes a charged wire to which a high voltage is applied. The charging portion 12 applies a predetermined potential to a surface of the photosensitive member 11 by corona discharge from the charged wire. Thus, the surface of the photosensitive member 11 is uniformly charged.

Light based on image data of a document sheet read by the image reading apparatus 6 is applied, from the exposure portion 13, to the photosensitive member 11 having been charged. Thus, potential on the surface of the photosensitive member 11 is selectively attenuated, thereby forming an electrostatic latent image on the surface of the photosensitive member 11.

Next, the electrostatic latent image on the surface of the photosensitive member 11 is developed by the developing portion 14, to form a toner image on the surface of the photosensitive member 11. The toner image is transferred, by the transfer portion 15, to the sheet 9 supplied between the photosensitive member 11 and the transfer portion 15.

The sheet 9 on which the toner image has been transferred is conveyed toward the fixing device 5 disposed downstream of the image forming portion 4 in the sheet conveying direction. In the fixing device 5, the sheet 9 is heated and pressurized, and the toner image is fused and fixed onto the sheet 9. Next, the sheet 9 on which the toner image has been fixed is discharged by a pair of discharge rollers 20 to a discharge tray 21.

After the toner image has been transferred to the sheet 9 by the transfer portion 15, toner left on the surface of the photosensitive member 11 is removed by the cleaning portion 16. Further, residual charge on the surface of the photosensitive member 11 is eliminated by the static eliminating portion 17. The photosensitive member 11 is charged again by the charging portion 12, and an image is formed in the same manner as described above.

Figure 2:
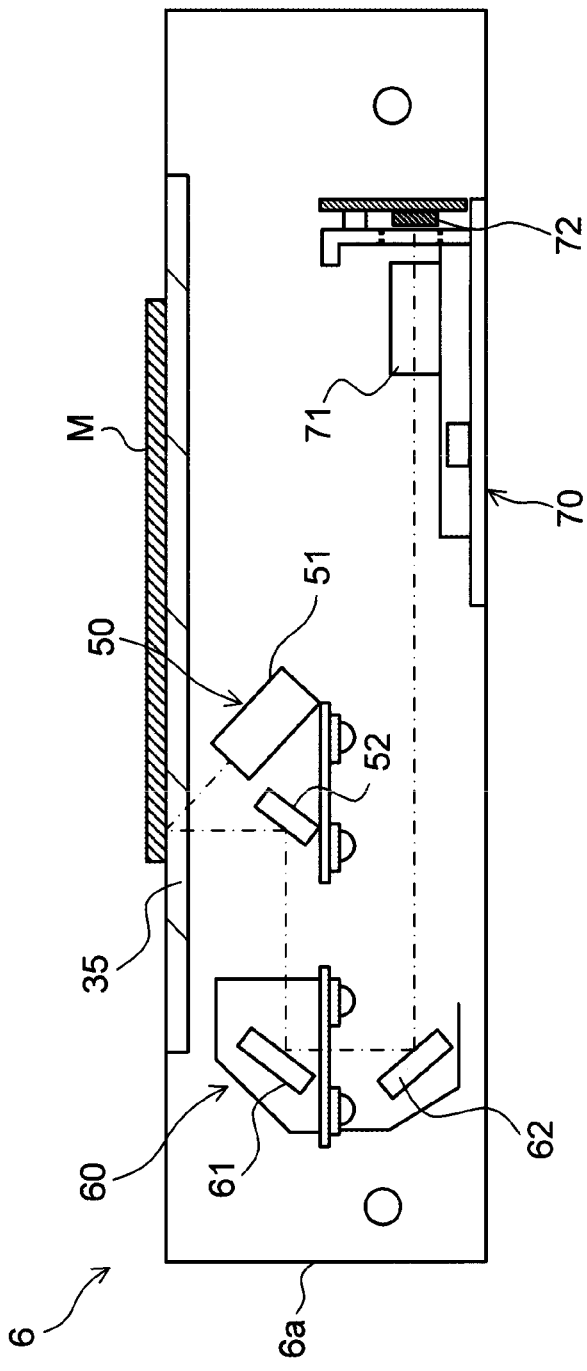
FIG. 2 is a cross-sectional view of the image reading apparatus shown in FIG. 1.

FIG. 2 is a cross-sectional view illustrating a configuration of the image reading apparatus 6. The image reading apparatus 6 includes the document sheet table 35 such as a contact glass, a first carriage 50 disposed below the document sheet table 35, the second carriage 60 disposed to the left of the first carriage 50, and a photoelectric converting portion 70 disposed to the right of the second carriage 60.

The first carriage 50 and the second carriage 60 are connected to not-illustrated scanning mechanism portions, respectively. Each of the scanning mechanism portions moves at a predetermined rate in the left-right direction in FIG. 2. Thus, a document sheet M on the document sheet table 35 is exposed to light and scanned, to read the entirety of the surface of the document sheet M.

The first carriage 50 includes a lighting portion 51 and a first mirror 52. The lighting portion 51 applies illumination light to the document sheet M on the document sheet table 35 so as to diffuse the light in the primary scanning direction (the front surface-back surface direction of the sheet of FIG. 2). The first mirror 52 reflects light reflected by the document sheet M toward the second carriage 60. The first mirror 52 is tilted by 45 degrees relative to the vertical direction and is held by the first carriage 50.

The second carriage 60 includes a second mirror 61 and a third mirror 62. The second mirror 61 is disposed so as to oppose the first mirror 52 in the horizontal direction. The second mirror 61 is tilted by 45 degrees relative to the vertical direction, in the same direction as the direction in which the first mirror 52 is tilted, and is held by the second carriage 60. The third mirror 62 is disposed below the second mirror 61 so as to oppose the second mirror 61. The third mirror 62 is tilted by 45 degrees relative to the vertical direction, in the direction opposite to the direction in which the second mirror 61 is tilted, and is held by the second carriage 60.

Therefore, the light reflected by the first mirror 52 of the first carriage 50 travels in the horizontal direction, to reach the second mirror 61, and the light reflected by the second mirror 61 travels downward, to reach the third mirror 62, and the light reflected by the third mirror 62 travels in the horizontal direction, to be guided to the photoelectric converting portion 70.

The photoelectric converting portion 70 includes an imaging lens 71 and an image sensor 72 disposed to the right of the imaging lens 71. The photoelectric converting portion 70 is fixed to an apparatus body 6a of the image reading apparatus 6. The imaging lens 71 focuses, on the image sensor 72, light that has been reflected by the document sheet M and incident through the third mirror 62. The image sensor 72 has imaging elements, such as a CCD, arrayed in the primary scanning direction (the front surface-back surface direction of the sheet of FIG. 2), and converts, to an electrical signal, an optical image of the document sheet M formed by the imaging lens 71.

In a case where a document sheet image is read in a state where the document sheet M is placed on the document sheet table 35, the document sheet M is lit by the lighting portion 51 of the first carriage 50, and the first carriage 50 moves rightward (in the secondary scanning direction) at a predetermined rate from an initial position shown in FIG. 2 to an end position that is a right end portion of the document sheet M. Further, the second carriage 60 moves rightward (in the secondary scanning direction) from the initial position shown in FIG. 2 at half the rate at which the first carriage 50 moves, in conjunction with the first carriage 50. At the positions, in the secondary scanning direction, on which each carriage moves, light reflected by the document sheet M due to light illuminated by the lighting portion 51 of the first carriage 50 is reflected by the first mirror 52 toward the second mirror 61 of the second carriage 60. In the second carriage 60, the light reflected by the document sheet M is reflected by the second mirror 61 toward the third mirror 62. The reflected light is further guided from the third mirror 62 to the imaging lens 71 of the photoelectric converting portion 70, and is focused, as an image, on the image sensor 72 by the imaging lens 71. A document sheet image formed on the image sensor 72 is converted to an electrical signal by a not-illustrated image processing circuit, to form image data. Thus, while the document sheet M is being lit by the lighting portion 51, the first carriage 50 moves from the initial position to the end position, thereby reading the document sheet image on the entirety of a surface of the document sheet M. When reading of the document sheet image is completed, the first carriage 50 and the second carriage 60 are returned to the initial positions, respectively.

In a case where an image on the document sheet M is read by a sheet through method, the first carriage 50 and the second carriage 60 are held at the initial positions shown in FIG. 2. The document sheet M is conveyed onto the document sheet table 35 by the document sheet conveying device 18 (see FIG. 1). Thus, the document sheet image on the document sheet M is sequentially read at a position, of the document sheet table 35, which opposes the initial positions, to form image data.

Figure 3:
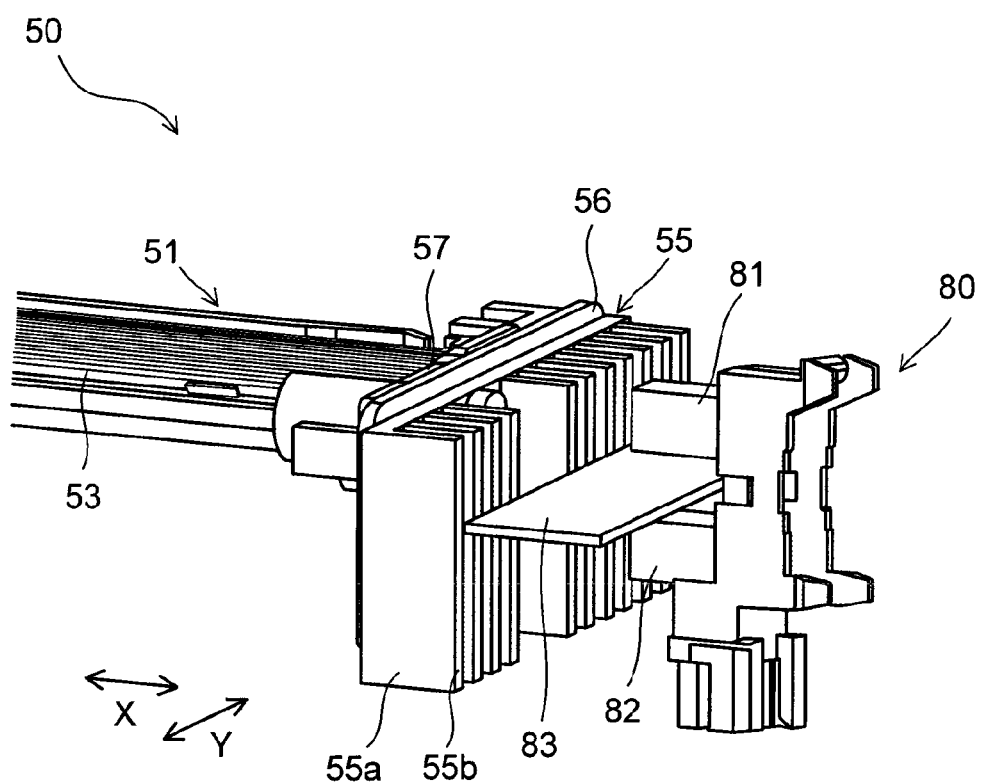
FIG. 3 is a perspective view illustrating configurations of a lighting portion and a position detecting portion of the image reading apparatus shown in FIG. 1.
Figure 4:
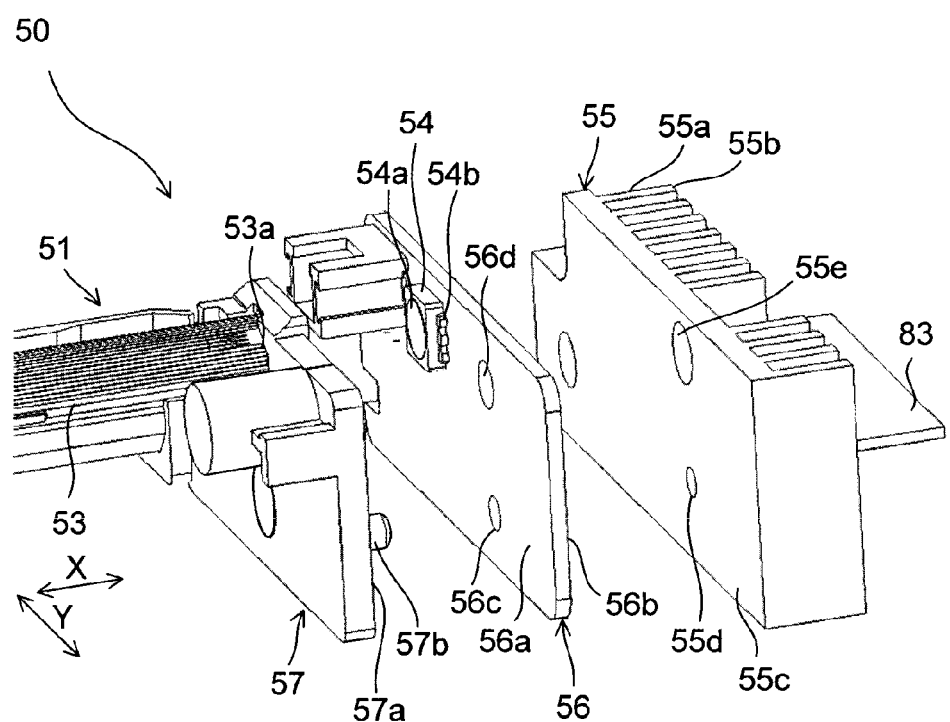
FIG. 4 is an exploded perspective view of the lighting portion and the position detecting portion shown in FIG. 3.

FIG. 3 and FIG. 4 illustrate configurations of the lighting portion 51 of the first carriage 50, and a position detecting portion 80 that detects an initial position of the first carriage 50. FIG. 3 is a perspective view illustrating the configurations of the lighting portion 51 and the position detecting portion 80. FIG. 4 is an exploded perspective view of components of the lighting portion 51 and the position detecting portion 80. FIG. 3 and FIG. 4 illustrate a configuration of a right end portion of the first carriage 50, and illustration of a light emitter 81 and a light receiver 82 of the position detecting portion 80 is omitted in FIG. 4.

As shown in FIG. 3, the lighting portion 51 of the first carriage 50 includes a light guide member 53, a light-emitting diode 54 (see FIG. 4) that is a light source, a heat dissipating member 55, a base plate 56 to which the light-emitting diode 54 is mounted, and a frame 57 that is a framework for the first carriage 50. Further, a detection member 83 is provided in the first carriage 50. The position detecting portion 80 that detects an initial position of the first carriage 50 is constructed by the detection member 83, the light emitter 81, and the light receiver 82. The light guide member 53 extends leftward in FIG. 3. However, the light-emitting diode 54, the heat dissipating member 55, and the position detecting portion 80 are not provided in the left end portion of the first carriage 50.

As shown in FIG. 4, the light guide member 53 extends in the primary scanning direction X so as to have a dimension corresponding to the length, in the width direction, of the document sheet table 35 (see FIG. 2), and is formed in a predetermined shape by an optically transparent material such as an acrylic resin. The light guide member 53 is mounted to the frame 57 (the first carriage 50) such that a light receiving surface 53a formed on the end surface, in the primary scanning direction X, of the light guide member 53 opposes the light-emitting diode 54. Light emitted from the light-emitting diode 54 is incident on the light receiving surface 53a of the light guide member 53. The light incident on the light receiving surface 53a is guided while being diffused in the light guide member 53 in the primary scanning direction X. The light diffused in the primary scanning direction X is applied to the document sheet table 35, to light the document sheet M on the document sheet table 35.

The light-emitting diode 54 includes a light emitting element 54a that emits light, and a substrate 54b having a circuit pattern formed thereon. The light emitting element 54a is disposed so as to oppose the light receiving surface 53a of the light guide member 53, and emits light toward the light receiving surface 53a. On the base plate 56, electric components such as a connector are mounted. The light-emitting diode 54 is mounted to a mounting surface 56a of the base plate 56. The base plate 56 is formed in a rectangular shape by a material having a relatively high heat conductivity. On a mounting surface 56b of the base plate 56 on a side opposite to the mounting surface 56a side, the heat dissipating member 55 is mounted.

The heat dissipating member 55 is used to dissipate heat generated in the light-emitting diode 54. The heat dissipating member 55 is formed by a material, such as aluminium, having a high heat dissipation effect. The heat dissipating member 55 has a mounting surface 55c having an area almost equal to an area of the mounting surface 56a of the base plate 56.

In the mounting surface 55c, a mounting hole 55e through which the heat dissipating member 55 is mounted to the frame 57 via the base plate 56 is formed. Further, in the base plate 56, a mounting hole 56d is formed so as to oppose the mounting hole 55e of the heat dissipating member 55. Further, in the frame 57, a screw hole (invisible in FIG. 4) is formed so as to oppose the mounting hole 55e of the heat dissipating member 55. Further, a positioning hole 55d is formed in the mounting surface 55c of the heat dissipating member 55 in order to position the heat dissipating member 55 and the base plate 56 relative to the frame 57 and mount them to the frame 57. Further, a positioning hole 56c is formed in the mounting surface 56a of the base plate 56. On the other hand, a projection 57b that fits into the positioning hole 55d and the positioning hole 56c is formed on a mounting surface 57a of the frame 57.

After the projection 57b is fitted into the positioning hole 55d and the positioning hole 56c, and the heat dissipating member 55 and the base plate 56 are positioned relative to the frame 57, a screw is screwed into the screw hole of the frame 57 through the mounting hole 55e and the mounting hole 56d. Thus, the heat dissipating member 55 and the base plate 56 are accurately mounted to the frame 57. Further, the mounting surface 55c of the heat dissipating member 55 is mounted in close contact with the mounting surface 56b of the base plate 56. Therefore, heat generated in the light-emitting diode 54 is transmitted to the heat dissipating member 55 via the base plate 56, and advantageously dissipated from the heat dissipating member 55.

On a surface of the heat dissipating member 55 on a side opposite to the mounting surface 55c side, a plurality of heat dissipating fins 55a are formed. A plurality of flat plates are vertically disposed and aligned at predetermined intervals along the secondary scanning direction Y, thereby forming the heat dissipating fins 55a. When heat is dissipated from the heat dissipating member 55, hot air flowing from the lower side toward the upper side is generated around the heat dissipating member 55. Therefore, when the flat plates are aligned at predetermined intervals along the secondary scanning direction Y, upward airflow is generated in spaces between the adjacent flat plates due to the hot air. Thus, heat transmitted to the heat dissipating member 55 is dissipated with an enhanced efficiency.

At projection end portions 55b of the heat dissipating fins 55a, the detection member 83 is formed so as to be integrated with the heat dissipating member 55. The detection member 83 has a depth dimension almost equal to the length, in the secondary scanning direction Y, of the heat dissipating member 55, and is formed as a flat plate that extends in the secondary scanning direction Y. Further, the detection member 83 is a flat plate having surfaces that are flat in the up-down direction (the up-down direction in FIG. 4). Therefore, in a state where spaces are each formed between the flat plates of adjacent ones of the plurality of heat dissipating fins 55a, the detection member 83 is disposed so as to oppose the projection end portions 55b of the heat dissipating fins 55a, and is formed so as to be integrated with the heat dissipating member 55. The heat dissipating member 55 and the detection member 83 are formed, by die casting, so as to be integrated with each other. For example, a mold for die casting is separated into an upper mold and a lower mold at a position corresponding to the detection member 83. Cores that can be laterally moved are used for portions corresponding to the mounting hole 55e and the positioning hole 55d of the mounting surface 55c. Thus, the heat dissipating member 55 and the detection member 83 are formed. After the forming, surfaces of the heat dissipating member 55 and the detection member 83 are treated with black alumite.

When the detection member 83 is formed in a flat-plate-like shape, and is integrated with the heat dissipating member 55, heat generated in the light-emitting diode 54 is advantageously dissipated from the detection member 83 as well as the heat dissipating member 55. The detection member 83 is further used, together with the light emitter 81 and the light receiver 82 (see FIG. 3), to detect an initial position of the first carriage 50. In this configuration, the image reading apparatus 6 for which increase in apparatus size is suppressed, can be obtained. Namely, even when the detection member 83 used to detect an initial position for document sheet reading is provided as well as the heat dissipating member 55 used to dissipate heat generated in the light-emitting diode 54 as a light source for lighting is provided, increase in sizes of the image reading apparatus 6 and image forming apparatus 1 can be suppressed.

As shown in FIG. 3, the light emitter 81 and the light receiver 82 oppose each other in the up-down direction and are supported by the apparatus body 6a (see FIG. 2). The light emitter 81 emits light toward the light receiver 82, and the light receiver 82 outputs a signal according to whether the light emitted from the light emitter 81 is received or blocked. The light emitter 81 and the light receiver 82 are disposed so as to oppose the detection member 83 when the first carriage 50 is at the initial position shown in FIG. 2.

Therefore, when the first carriage 50 reciprocates in the secondary scanning direction Y, and then returns to the initial position, the light emitted from the light emitter 81 is blocked by the detection member 83, and the light receiver 82 does not receive light emitted from the light emitter 81. Thus, the initial position of the first carriage 50 is detected. Specifically, by the first carriage 50 moving in the secondary scanning direction Y, light emitted from the light emitter 81 is blocked by the end surface, in the secondary scanning direction Y, of the detection member 83, so that the light receiver 82 outputs an off signal. When a predetermined time period has elapsed after the output of the off signal, namely, when the detection member 83 is positioned relative to the light receiver 82 such that almost the center, in the depth direction (the secondary scanning direction), of the detection member 83 is on the light receiver 82, driving of a motor (not-shown) that drives the first carriage 50 is stopped, thereby holding the first carriage 50 at the initial position.

Since the surface of the detection member 83 is treated so as to have black color, the light emitted from the light emitter 81 is assuredly blocked by the detection member 83. Therefore, the first carriage 50 is less likely to stop at a position deviated from the initial position. Further, since the surface of the detection member 83 is treated so as to have black color, heat dissipating efficiency is enhanced. Therefore, both the surface of the detection member 83 and the surface of the heat dissipating member 55 are treated so as to have black color, thereby more advantageously dissipating heat generated in the light-emitting diode 54.

Second Embodiment

Figure 5:
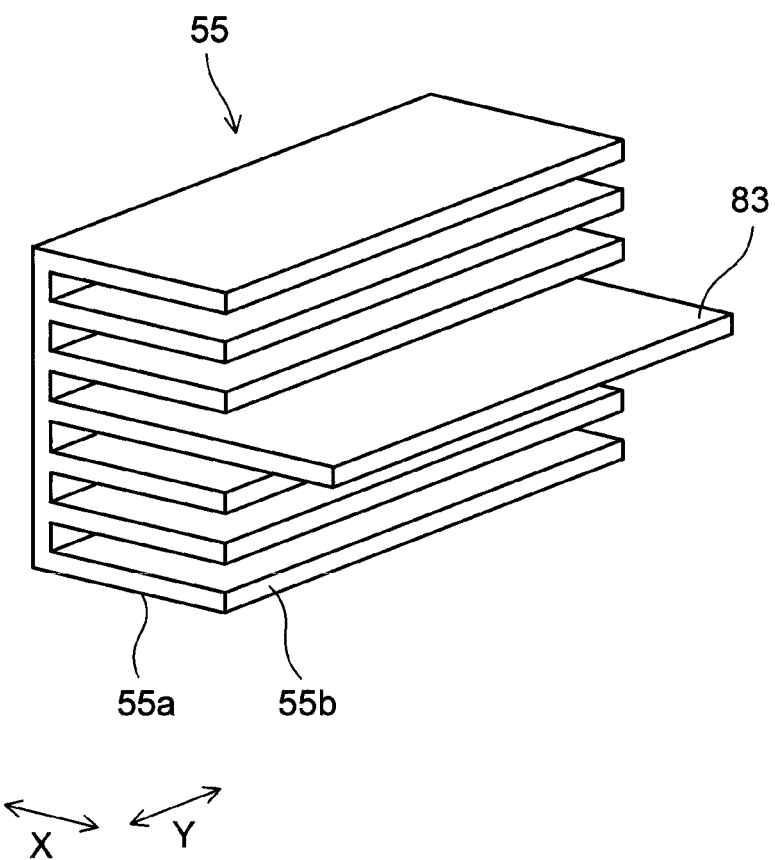
FIG. 5 is a perspective view illustrating configurations of a heat dissipating member and a detection member according to a second embodiment of the present disclosure.

FIG. 5 is a perspective view illustrating configurations of a heat dissipating member 55 and a detection member 83 according to a second embodiment of the present disclosure. In the second embodiment, a plurality of heat dissipating fins 55*a* are aligned in up-down direction. Difference in configurations of the heat dissipating member 55 and the detection member 83 from those of the first embodiment will be mainly described. Hereinafter, description of the same components as those of the first embodiment is not given.

In the heat dissipating member 55, a plurality of heat dissipating fins 55*a* are formed. A plurality of flat plates are aligned at predetermined intervals along the up-down direction (the up-down direction in FIG. 5) to form the heat dissipating fins 55*a*. When the first carriage 50 (see FIG. 2) moves in the secondary scanning direction Y, airflow in the secondary scanning direction Y is generated, around the heat dissipating member 55, relative to spaces in which the first carriage 50 moves, due to movement of the first carriage 50. Therefore, when the flat plates are aligned at predetermined intervals along the up-down direction, airflow in the secondary scanning direction Y is generated in spaces between the adjacent flat plates, thereby dissipating heat transmitted to the heat dissipating member 55 with an enhanced efficiency.

In the plurality of heat dissipating fins 55*a*, one of the flat plates is formed so as to project more greatly than projection end portions 55*b* of the other flat plates. In the present embodiment, the flat plate located at the center of the plurality of flat plates aligned in up-down direction projects most greatly, and the most greatly projecting flat plate is used as the detection member 83. The flat plate used as the detection member 83 may be a flat plate located above or below the flat plate located at the center. The heat dissipating member 55 and the detection member 83 are formed into a predetermined shape, by die casting, from a material, such as aluminium, having a high heat dissipation effect, and the surfaces thereof are treated with black alumite.

As in the first embodiment, the detection member 83 is provided so as to be movable between the light emitter 81 and the light receiver 82 (see FIG. 3) that are disposed in the up-down direction so as to oppose each other. When the first carriage 50 is at an initial position (see FIG. 2), light emitted from the light emitter 81 is blocked by the detection member 83. Due to this blocking, the light receiver 82 does not receive light emitted from the light emitter 81, thereby detecting the initial position of the first carriage 50.

When the detection member 83 is formed in a flat-plate-like shape, and is integrated with the heat dissipating member 55, heat generated in the light-emitting diode 54 is advantageously dissipated from the detection member 83 as well as the heat dissipating member 55, and the detection member 83 is further used, together with the light emitter 81 and the light receiver 82 (see FIG. 3), to detect the initial position of the first carriage 50. In this configuration, the image reading apparatus 6 for which increase in apparatus size is suppressed, can be obtained.

Since the surface of the detection member 83 is treated so as to have black color, light emitted from the light emitter 81 is assuredly blocked by the detection member 83, and the first carriage 50 is less likely to stop at a position deviated from the initial position. Further, since the surface of the detection member 83 is treated so as to have black color, heat dissipating efficiency is enhanced. Therefore, both the surface of the detection member 83 and the surface of the heat dissipating member 55 are treated so as to have black color, thereby more advantageously dissipating heat generated in the light-emitting diode 54.

The heat dissipating member 55 and the position detecting portion 80 of each of the first and the second embodiments are applicable to the image reading apparatus 6 that includes the first carriage 50 and the second carriage 60 that move in the secondary scanning direction Y, and the photoelectric converting portion 70 disposed below the first carriage 50. In the image reading apparatus 6 having this configuration, a light path for a document sheet image from the second carriage 60 toward the photoelectric converting portion 70 is formed below the first carriage 50. Therefore, if the position detecting portion 80 including a detection member is disposed, on a lower surface of the first carriage 50, in a primary scanning range for reading, a problem may arise that the light path is interrupted by the detection member or the like. Therefore, the image reading apparatus 6 having the configuration described above is advantageous in that, as in the embodiments, the detection member 83 is disposed in one end portion in the primary scanning direction X, and is further integrated with the heat dissipating member 55. The embodiments may be applied to image reading apparatuses other than the image reading apparatus 6 having the configuration described above. For example, the embodiments may be applied to an image reading apparatus in which the first carriage 50 includes the lighting portion 51 and the photoelectric converting portion 70, and, when the first carriage 50 moves in the secondary scanning direction Y, the photoelectric converting portion 70 moves together with the lighting portion 51, whereby the document sheet M is scanned and a document sheet image is read.

Further, in the first and the second embodiments, the heat dissipating member 55 is disposed in one end portion in the primary scanning direction. However, the present disclosure is not limited thereto. In an image reading apparatus that reads a document sheet in which a width (the length in the primary scanning direction) of a document sheet size is great, in a case where the light-emitting diodes 54 are disposed in both end portions in the primary scanning direction X, the heat dissipating members 55 may be disposed in both end portions in the primary scanning direction X, and the detection member 83 may be integrated with one of the heat dissipating members 55. Also in this case, the same effects as in the embodiments described above are obtained Further, in the first and the second embodiments, the position detecting portion 80 is a photointerrupter in which the light emitter 81 and the light receiver 82 oppose each other. However, the present disclosure is not limited thereto. The position detecting portion 80 may have a structure in which, when the detection member 83 passes by the light emitter 81, light emitted from the light emitter 81 is reflected by the detection member 83, and the light receiver 82 receives the reflected light, thereby detecting a position. In this case, the detection member 83 extends in the secondary scanning direction Y, is formed as a flat plate having surfaces that are flat in the primary scanning direction X, opposes the projection end portions 55b of the heat dissipating fins 55a, and integrated with the heat dissipating member 55. Alternatively, the detection member 83 may be disposed above or below the heat dissipating fins 55a, and integrated with the heat dissipating member 55. Also in this case, the same effects as in the embodiments described above are obtained.

Further, in the first and the second embodiments, the frame 57 includes the projection 57b that fits into the positioning hole 55d and the positioning hole 56c, in order to position the heat dissipating member 55 and the base plate 56 relative to the frame 57 and mount them to the frame 57. The present disclosure is not limited thereto. The heat dissipating member 55 may have a positioning projection formed therein, and the base plate 56 and the frame 57 may have formed therein positioning holes into which the positioning projection is fitted.

The present disclosure is applicable to image reading apparatuses that are used for copying machines, facsimile machines, multifunctional peripherals incorporating the entirety or some of functions of these machines, image scanners, and the like, and that scan and read document sheets, and is applicable to image forming apparatuses including the image reading apparatuses.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:
a document sheet table having a top surface on which a document sheet is placed;
a first carriage that has a lighting portion which applies light from a light source so as to diffuse the light toward the document sheet table in a primary scanning direction, that has a first mirror which reflects, in a horizontal direction, light applied by the lighting portion and reflected by an image surface of the document sheet, and that can reciprocate in a secondary scanning direction orthogonal to the primary scanning direction;
a second carriage that has a second mirror which reflects, downward, the light reflected by the first mirror, and that has a third mirror which, disposed below the second mirror, reflects, in the horizontal direction, the light reflected by the second mirror, and that can reciprocate in the secondary scanning direction in conjunction with the first carriage;
a photoelectric converting portion that receives, as image light, light obtained by the light applied by the lighting portion being reflected by the image surface of the document sheet, further reflected by the first mirror, the second mirror, and the third mirror, and travelling in the horizontal direction, and that converts the received image light to an electrical signal; and
a position detecting portion that detects an initial position in reciprocating of the first carriage, wherein
the light source is disposed at an end portion, in the primary scanning direction, of the lighting portion,
the lighting portion includes: a light guide member on which the light from the light source is incident, and which guides the incident light in the primary scanning direction and applies the light to the document sheet table; and a heat dissipating member that dissipates heat generated in the light source,
the position detecting portion includes: a light emitter that emits light; a light receiver that receives the light emitted from the light emitter; and a detection member that moves in the secondary scanning direction along with the reciprocating of the first carriage, in order to detect the initial position of the first carriage, and
the detection member is formed as a flat plate that is integrated with the heat dissipating member and extends in the secondary scanning direction.

2. The image reading apparatus according to claim 1, wherein the heat dissipating member has a plurality of flat plates aligned at predetermined intervals in the secondary scanning direction, and the detection member is integrated with projecting end portions of the plurality of flat plates.

3. The image reading apparatus according to claim 2, wherein
the position detecting portion has the light emitter and the light receiver that oppose each other, and the detection member is disposed so as to move between the light emitter and the light receiver, and
when a predetermined time period elapses since reception of the light emitted from the light emitter is stopped in the light receiver due to the light emitted from the light emitter being blocked by the detection member, the first carriage is stopped, to position the first carriage at the initial position.

4. The image reading apparatus according to claim 3, wherein a surface of each of the heat dissipating member and the detection member is black in color.

5. The image reading apparatus according to claim 4, wherein
both the light source and the heat dissipating member are disposed in each of both end portions, in the primary scanning direction, of the lighting portion, and
the detection member is integrated with the heat dissipating member in one of the end portions.

6. The image reading apparatus according to claim 5, wherein
the light source includes a light-emitting diode, and a base plate to which the light-emitting diode is mounted, and
the heat dissipating member is mounted to a surface of the base plate on a side opposite to a side on which the light-emitting diode is mounted.

7. The image reading apparatus according to claim 6, wherein the heat dissipating member is positioned by a projection formed in the first carriage, and positioning holes which are formed in the base plate and the heat dissipating member, respectively, and into which the projection is fitted, and the heat dissipating member is mounted to the first carriage through the base plate.

8. The image reading apparatus according to claim 1, wherein the heat dissipating member has a plurality of flat plates aligned at predetermined intervals in an up-down direction, and one of the plurality of flat plates is used as the detection member and projects more greatly than others of the plurality of flat plates.

9. The image reading apparatus according to claim 8, wherein the position detecting portion has the light emitter and the light receiver that oppose each other, and the detection member is disposed so as to move between the light emitter and the light receiver, and
when a predetermined time period elapses since reception of the light emitted from the light emitter is stopped in the light receiver due to the light emitted from the light emitter being blocked by the detection member, the first carriage is stopped, to position the first carriage at the initial position.

10. The image reading apparatus according to claim 9, wherein
both the light source and the heat dissipating member are disposed in each of both end portions, in the primary scanning direction, of the lighting portion, and
the detection member is integrated with the heat dissipating member in one of the end portions.

11. The image reading apparatus according to claim 10, wherein
the light source includes a light-emitting diode, and a base plate to which the light-emitting diode is mounted, and
the heat dissipating member is mounted to a surface of the base plate on a side opposite to a side on which the light-emitting diode is mounted.

12. The image reading apparatus according to claim 1, wherein
the position detecting portion has the light emitter and the light receiver that oppose each other, and the detection member is disposed so as to move between the light emitter and the light receiver, and
when a predetermined time period elapses since reception of the light emitted from the light emitter is stopped in the light receiver due to the light emitted from the light emitter being blocked by the detection member, the first carriage is stopped, to position the first carriage at the initial position.

13. The image reading apparatus according to claim 1, wherein a surface of each of the heat dissipating member and the detection member is black in color.

14. The image reading apparatus according to claim 1, wherein
both the light source and the heat dissipating member are disposed in each of both end portions, in the primary scanning direction, of the lighting portion, and
the detection member is integrated with the heat dissipating member in one of the end portions.

15. The image reading apparatus according to claim 1, wherein
the light source includes a light-emitting diode, and a base plate to which the light-emitting diode is mounted, and
the heat dissipating member is mounted to a surface of the base plate on a side opposite to a side on which the light-emitting diode is mounted.

16. The image reading apparatus according to claim 15, wherein the heat dissipating member is positioned by a projection formed in the first carriage, and positioning holes which are formed in the base plate and the heat dissipating member, respectively, and into which the projection is fitted, and the heat dissipating member is mounted to the first carriage through the base plate.

17. An image forming apparatus comprising
an image reading apparatus, and
an image forming portion that forms an image on a recording medium, wherein
the image reading apparatus includes
a document sheet table having a top surface on which a document sheet is placed;
a first carriage that has a lighting portion which applies light from a light source so as to diffuse the light toward the document sheet table in a primary scanning direction, that has a first mirror which reflects, in a horizontal direction, light applied by the lighting portion and reflected by an image surface of the document sheet, and that can reciprocate in a secondary scanning direction orthogonal to the primary scanning direction;
a second carriage that has a second mirror which reflects, downward, the light reflected by the first mirror, and that has a third mirror which, disposed below the second mirror, reflects, in the horizontal direction, the light reflected by the second mirror, and that can reciprocate in the secondary scanning direction in conjunction with the first carriage;
a photoelectric converting portion that receives, as image light, light obtained by the light applied by the lighting portion being reflected by the image surface of the document sheet, further reflected by the first mirror, the second mirror, and the third mirror, and travelling in the horizontal direction, and that converts the received image light to an electrical signal; and
a position detecting portion that detects an initial position in reciprocating of the first carriage, wherein
the light source is disposed at an end portion, in the primary scanning direction, of the lighting portion,
the lighting portion includes: a light guide member on which the light from the light source is incident, and which guides the incident light in the primary scanning direction and applies the light to the document sheet table; and a heat dissipating member that dissipates heat generated in the light source,
the position detecting portion includes: a light emitter that emits light; a light receiver that receives the light emitted from the light emitter; and a detection member that moves in the secondary scanning direction along with the reciprocating of the first carriage, in order to detect the initial position of the first carriage, and
the detection member is formed as a flat plate that is integrated with the heat dissipating member and extends in the secondary scanning direction.

* * * * *